United States Patent

Gaggar et al.

Patent Number: 5,962,587
Date of Patent: Oct. 5, 1999

[54] HIGH MODULUS THERMOPLASTIC RESIN COMPOSITION

[75] Inventors: Satish Kumar Gaggar, Parkersburg; Marshall Dewey Moore, Washington, both of W. Va.

[73] Assignee: General Electric Company, Pittsfield, Mass.

[21] Appl. No.: 08/956,669

[22] Filed: Oct. 23, 1997

[51] Int. Cl.[6] ........................................ C08G 63/48
[52] U.S. Cl. ................................ 525/72; 525/199
[58] Field of Search .......................... 525/199, 72

[56] References Cited

U.S. PATENT DOCUMENTS

| | | |
|---|---|---|
| 3,671,487 | 6/1972 | Abolins . |
| 3,723,373 | 3/1973 | Lucas . |
| 3,853,809 | 12/1974 | Martin et al. . |
| 4,469,846 | 9/1984 | Khan et al. . |
| 4,574,141 | 3/1986 | Cheng et al. . |
| 4,579,906 | 4/1986 | Zabrocki et al. . |
| 4,767,821 | 8/1988 | Lindner et al. . |
| 4,810,739 | 3/1989 | Lindner et al. . |
| 4,877,839 | 10/1989 | Conti-Ramsden et al. . |
| 4,904,726 | 2/1990 | Mogan et al. . |
| 4,904,735 | 2/1990 | Chapman, Jr. et al. ............. 525/199 |
| 5,010,121 | 4/1991 | Yeates et al. . |
| 5,102,696 | 4/1992 | Pan et al. . |
| 5,198,502 | 3/1993 | Tatemoto ............................. 525/199 |
| 5,324,785 | 6/1994 | Noda et al. . |
| 5,411,999 | 5/1995 | Gallucci . |
| 5,494,752 | 2/1996 | Shimizu et al. . |
| 5,521,230 | 5/1996 | Bhatia et al. . |
| 5,539,036 | 7/1996 | Fong et al. . |
| 5,679,741 | 10/1997 | Breton et al. ...................... 525/199 |
| 5,741,854 | 4/1998 | Huang ................................ 525/199 |

FOREIGN PATENT DOCUMENTS

| | | |
|---|---|---|
| 0 178 280 | 4/1986 | European Pat. Off. . |
| 0 465 927 | 1/1992 | European Pat. Off. . |
| 0 739 914 A1 | 10/1996 | European Pat. Off. . |
| 2 733 503 A1 | 10/1996 | France . |
| 2758946 | 7/1978 | Germany ........................... 525/199 |
| 3 903 547 | 8/1990 | Germany . |
| 39 28 153 | 2/1991 | Germany . |
| 45-3940 | 2/1970 | Japan ................................. 525/199 |
| 60-28443 | 2/1985 | Japan ................................. 525/199 |
| XP002088875 | 5/1993 | United Kingdom . |

OTHER PUBLICATIONS

Monomer Reactivity Ratios in Graft Copolymerization, Journal of Polymer Science Part A–I, vol. 9, 91–105 (1971).

*Primary Examiner*—Bernard Lipman
*Assistant Examiner*—N. Sarofim

[57] ABSTRACT

A thermoplastic resin composition includes a rubber modified thermoplastic resin and from 2 parts by weight to 20 parts by weight of a fluoropolymer, based on 100 parts by weight of the resin composition, imparts a high tensile modulus, ductility and a low friction surface to articles molded therefrom.

8 Claims, No Drawings

HIGH MODULUS THERMOPLASTIC RESIN COMPOSITION

TECHNICAL FIELD

The present invention is directed to a thermoplastic resin composition, more particularly to a thermoplastic resin composition that exhibits a high tensile modulus.

BACKGROUND

The use of relatively small amounts such as, for example, from 0.1 to about 1 percent by weight, of polytetrafluroethylene ("PTFE") as an anti-drip additive in flame retardant grades of ABS-type thermoplastic resin molding compositions is known, see, for example, U.S. Pat. No. 4,810,739 and 4,579,906, as are additives having a high PTFE content for use in making such compositions, see, for example, U.S. Pat. No. 4,810,739.

An ABS-type rubber-modified thermoplastic resin composition suitable for molding articles that exhibit a high tensile modulus as well as a low friction surface is now desired.

SUMMARY OF THE INVENTION

In a first aspect, the present invention is directed to a thermoplastic resin molding composition that comprises a substantially homogeneous mixture of:

(a) a rubber modified thermoplastic resin, comprising a discontinuous elastomeric phase dispersed in a rigid thermoplastic phase, wherein at least a portion of the rigid thermoplastic phase is chemically grafted to the elastomeric phase; and (b) from 2 parts by weight to 20 parts by weight ("pbw") of a fluoropolymer, based on 100 parts by weight of the resin composition.

The composition of the present invention imparts a high tensile modulus, ductility and a low friction surface to articles molded therefrom.

In a second aspect, the present invention is directed to a method for making a thermoplastic resin composition comprising: combining:

(a) a rubber modified thermoplastic resin, comprising a discontinuous elastomeric phase dispersed in a rigid thermoplastic phase, wherein at least a portion of the rigid thermoplastic phase is chemically grafted to the elastomeric phase together with (b) a fluoropolymer additive comprising particles of a fluoropolymer encapsulated in a second polymer, to form a substantially homogeneous mixture, wherein the fluoropolymer content of the thermoplastic resin composition is from 2 pbw to 20 pbw, based on 100 pbw of the thermoplastic resin composition.

DETAILED DESCRIPTION OF THE INVENTION

In a preferred embodiment, the composition of the present invention includes from 3 to 15 pbw, more preferably from 4 to 12 pbw and still more preferably from 5 to 10 pbw of the fluoropolymer per 100 pbw of the thermoplastic resin composition.

Rubber Modified Thermoplastic Resin

The rubber modified thermoplastic resin of the present invention comprises a discontinuous elastomeric phase dispersed in a continuous rigid thermoplastic phase, wherein at least a portion of the rigid thermoplastic phase is chemically grafted to the elastomeric phase.

(a) Elastomeric Phase

Suitable materials for use as the elastomeric phase are polymers those having a glass transition temperature ($T_g$) of less than or equal to 25° C., more preferably less than or equal to 0° C., and even more preferably less than or equal to −30° C. As referred to herein, the $T_g$ of a polymer is the $T_g$ value of polymer as measured by differential scanning calorimetry (heating rate 20° C./minute, with the $T_g$ value being determined at the inflection point).

In a preferred embodiment, the elastomer phase comprises a polymer having first repeating units derived from one or more monoethylenically unsaturated monomers selected from conjugated diene monomers, non-conjugated diene monomers and ($C_1$–$C_{12}$) alkyl (meth)acrylate monomers and, optionally, having second repeating units derived from one or more monoethylenically unsaturated monomers selected from vinyl aromatic monomers and monoethylenically unsaturated nitrile monomers.

Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4, hexadiene, dichlorobutadiene, bromobutadiene and dibromobutadiene as well as mixtures of conjugated diene monomers. In a preferred embodiment, the conjugated diene monomer is 1,3-butadiene.

Suitable non-conjugated diene monomers include, e.g., ethylidene norbornene, dicyclopentadiene, hexadiene or phenyl norbornene. As used herein, the term "($C_2$–$C_8$)olefin monomers" means a compound having from 2 to 8 carbon atoms per molecule and having a single site of ethylenic unsaturation per molecule. Suitable ($C_2$–$C_8$)olefin monomers include, e.g., ethylene, propene, 1-butene, 1-pentene, heptene.

As used herein, the term "($C_1$–$C_{12}$)alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl, and the terminology "(meth)acrylate monomers" refers collectively to acrylate monomers and methacrylate monomers. Suitable ($C_1$–$C_{12}$)alkyl (meth)acrylate monomers include ($C_1$–$C_{12}$)alkyl acrylate monomers, e.g., ethyl acrylate, butyl acrylate, iso-pentyl acrylate, n-hexyl acrylate, 2-ethyl hexyl acrylate, and their ($C_1$–$C_{12}$)alkyl methacrylate analogs such as, e.g., methyl methacrylate, ethyl methacrylate, propyl methacrylate, iso-propyl methacrylate, butyl methacrylate, hexyl methacrylate, decyl methacrylate.

Suitable vinyl aromatic monomers include, e.g., styrene and substituted styrenes having one or more alkyl, alkoxyl, hydroxyl or halo substituent group attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used herein, the term "monoethylenically unsaturated nitrile monomer" means an acyclic compound that includes a single nitrile group and a single site of ethylenic unsaturation per molecule and includes, e.g., acrylonitrile, methacrylonitrile, α-chloro acrylonitrile.

The elastomeric phase may, optionally, include a minor amount, e.g., up to 5 wt %, of repeating units derived from a polyethylenically unsaturated "crosslinking" monomer, e.g., butylene diacrylate, divinyl benzene, butene diol dimethacrylate, trimethylolpropane tri(meth)acrylate. As used herein, the term "polyethylenically unsaturated" means having two or more sites of ethylenic unsaturation per molecule.

The elastomeric phase may, particularly in those embodiments wherein the elastomeric phase has repeating units derived from alkyl (meth)acrylate monomers, include a minor amount, e.g., up to 5 wt % of repeating units derived from a polyethylenically unsaturated "graftlinking" monomer. Suitable graftlinking monomers include those monomers having a first site of ethylenic unsaturation with a reactivity similar to that of the monoethylenically unsaturated monomers from which the respective substrate or superstrate is derived and a second site of ethylenic unsaturation with a relative reactivity that is substantially different from that of the monoethylenically unsaturated monomers from which the elastomeric phase is derived so that the first site reacts during synthesis of the elastomeric phase and the second site is available for later reaction under different reaction conditions, e.g., during synthesis of the rigid thermoplastic phase. Suitable graftlinking monomers include, e.g., allyl methacrylate, diallyl maleate, triallyl cyanurate.

In a preferred embodiment, the elastomeric phase comprises from 60 to 100 wt % repeating units derived from one or more conjugated diene monomers and from 0 to 40 wt % repeating units derived from one or more monomers selected from vinyl aromatic monomers and monoethylenically unsaturated nitrile monomers, such as, e.g., a styrene-butadiene copolymer, an acrylonitrile-butadiene copolymer or a styrene-butadiene-acrylonitrile copolymer.

In an alternative preferred embodiment, the elastomeric phase comprises repeating units derived from one or more $(C_1-C_{12})$alkyl acrylate monomers. In a more highly preferred embodiment, the rubbery polymeric substrate comprises from 40 to 95 wt % repeating units derived from one or more $(C_1-C_{12})$alkyl acrylate monomers, more preferably from one or more monomers selected from ethyl acrylate, butyl acrylate and n-hexyl acrylate.

In a preferred embodiment, the elastomeric phase is made by aqueous emulsion polymerization in the presence of a free radical initiator, e.g., an azonitrile initiator, an organic peroxide initiator, a persulfate initiator or a redox initiator system, and, optionally, in the presence of a chain transfer agent, e.g., an alkyl mercaptan and coagulated to form particles of elastomeric phase material. In a preferred embodiment, the emulsion polymerized particles of elastomeric phase material have a weight average particle size of 50 to 800 nm, more preferably, of from 100 to 500 nm, as measured by light transmission. The size of emulsion polymerized elastomeric particles may optionally be increased by mechanical or chemical agglomeration of the emulsion polymerized particles, according to known techniques.

(b) Rigid Thermoplastic Phase

The rigid thermoplastic resin phase comprises one or more thermoplastic polymers and exhibits a $T_g$ of greater than 25° C., preferably greater than or equal to 90° C. and even more preferably greater than or equal to 100° C.

In a preferred embodiment, the rigid thermoplastic phase comprises a polymer or a mixture of two or more polymers each having repeating units derived from one or more monomers selected from the group consisting of $(C_1-C_{12})$ alkyl (meth)acrylate monomers, vinyl aromatic monomers and monoethylenically unsaturated nitrile monomers. Suitable $(C_1-C_{12})$alkyl (meth)acrylate monomers, vinyl aromatic monomers and monoethylenically unsaturated nitrile monomers are those set forth above in the description of the elastomeric phase.

In a highly preferred embodiment, rigid thermoplastic phase comprises one or more vinyl aromatic polymers.

Suitable vinyl aromatic polymers comprise at least 50 wt % repeating units derived from one or more vinyl aromatic monomers.

In a preferred embodiment, the rigid thermoplastic resin phase comprises a vinyl aromatic polymer having first repeating units derived from one or more vinyl aromatic monomers and having second repeating units derived from one or more monoethylenically unsaturated nitrile monomers.

The rigid thermoplastic phase is made according to known processes, e.g., mass polymerization, emulsion polymerization, suspension polymerization or combinations thereof, wherein a at least a portion of the rigid thermoplastic phase is chemically bonded, i.e., "grafted" to the elastomeric phase via reaction with unsaturated sites present in the elastomeric phase. The unsaturated sites in the elastomeric phase are provided, e.g., by residual unsaturated sites in repeating units derived from a conjugated diene or by residual unsaturated sites in repeating units derived from a graftlinking monomer.

In a preferred embodiment, at least a portion of the rigid thermoplastic phase is made by an aqueous emulsion or aqueous suspension polymerization reaction in the presence of elastomeric phase and a polymerization initiator system, e.g., a thermal or redox initiator system.

In an alternative preferred embodiment, at least a portion of the thermoplastic phase is made by a mass polymerization process, wherein particles of the material from which the elastomeric phase is to be formed is dissolved in a mixture of the monomers from which the rigid thermoplastic phase is to be formed and the monomers of the mixture are then polymerized to form the rubber modified thermoplastic resin.

The amount of grafting that takes place between the rigid thermoplastic phase and the elastomeric phase varies with the relative amount and composition of the elastomeric phase. In a preferred embodiment, from 10 to 90 wt %, preferably from 25 to 60 wt %, of the rigid thermoplastic phase is chemically grafted to the elastomeric phase and from 10 to 90 wt %, preferably from 40 to 75 wt % of the rigid thermoplastic phase remains "free", i.e., non-grafted.

The rigid thermoplastic phase of the rubber modified thermoplastic resin may be formed: (i) solely by polymerization carried out in the presence of the elastomeric phase or (ii) by addition of one or more separately polymerized rigid thermoplastic polymers to a rigid thermoplastic polymer that has been polymerized in the presence of the elastomeric phase.

Each of the polymers of the elastomeric phase and of the rigid thermoplastic resin phase of the rubber modified thermoplastic resin may, provided that the $T_g$ limitation for the respective phase is satisfied, optionally include up to 10 wt % of third repeating units derived from one or more other copolymerizable monomers such as, e.g., monoethylenically unsaturated carboxylic acids such as, e.g., acrylic acid, methacrylic acid, itaconic acid, hydroxy$(C_1-C_{12})$alkyl (meth)acrylate monomers such as, e.g., hydroxyethyl methacrylate; $(C_4-C_{12})$cycloalkyl (meth)acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "$(C_4-C_{12})$cycloalkyl" means a cyclic alkyl substituent group having from 4 to 12 carbon atoms per group and the term "(meth)acrylamide" refers collectively to acrylamides and methacrylamides.

In a preferred embodiment, the rubber modified thermoplastic resin comprises an elastomeric phase comprising a polymer having repeating units derived from one or more conjugated diene monomers, and, optionally, further comprising repeating units derived from one or more monomers selected from vinyl aromatic monomers and monoethylenically unsaturated nitrile monomers, and the rigid thermoplastic phase comprises a polymer having repeating units derived from one or more monomers selected from vinyl aromatic monomers and monoethylenically unsaturated nitrile monomers.

In a highly preferred embodiment, the rubber modified thermoplastic resin comprises an elastomeric phase comprising a polymer having repeating units derived from butadiene or from butadiene and styrene and a rigid thermoplastic phase comprising a polymer having repeating units derived from derived from acrylonitrile and one or more of styrene and α-methyl styrene.

Fluoropolymer Additive

Suitable fluoropolymers and methods for making such fluoropolymers are known, see, e.g., U.S. Pat. Nos. 3,671,487, 3,723,373 and 3,383,092. Suitable fluoropolymers include homopolymers and copolymers that comprise repeating units derived from one or more fluorinated α-olefin monomers. The term "fluorinated α-olefin monomer" means an α-olefin monomer that includes at least one fluorine atom substituent. Suitable fluorinated α-olefin monomers include, e.g., fluoroethylenes such as, e.g., $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$ and fluoropropylenes such as, e.g., $CF_3CF=CF_2$, $CF_3CF=CHF$, $CF_3CH=CF_2$, $CF_3CH=CH_2$, $CF_3CF=CHF$, $CHF_2CH=CHF$ and $CF_3CH=CH_2$. In a preferred embodiment, the fluorinated α-olefin monomer is one or more of tetrafluoroethylene ($CF_2=CF_2$), chlorotrichloroethylene ($CClF=CF_2$), vinylidene fluoride ($CH_2=CF_2$) and hexafluoropropylene ($CF_2=CFCF_3$).

Suitable fluorinated α-olefin homopolymers include e.g., poly(tetra-fluoroethylene), poly(hexafluoroethylene).

Suitable fluorinated α-olefin copolymers include copolymers comprising repeating units derived from two or more fluorinated α-olefin copolymers such as , e.g., poly (tetrafluoroethylene-hexafluoroethylene), and copolymers comprising repeating units derived from one or more fluorinated monomers and one or more non-fluorinated monoethylenically unsaturated monomers that are copolymerizable with the fluorinated monomers such as, e.g., poly (tetrafluoroethylene-ethylene-propylene) copolymers. Suitable non-fluorinated monoethylenically unsaturated monomers include e.g., α-olefin monomers such as, e.g., ethylene, propylene butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate.

In a highly preferred embodiment, the fluoropolymer is a poly(tetrafluoroethylene) homopolymer.

In a preferred embodiment, a fluoropolymer is added to the rubber modified thermoplastic resin in the form of a fluoropolymer additive that comprises particles of fluoropolymer encapsulated in a second polymer.

In a preferred embodiment, the fluoropolymer additive comprises from 30 to 70 wt %, more preferably 40 to 60 wt %, of the fluoropolymer and from 30 to 70 wt %, more preferably 40 to 60 wt %, of the second polymer.

The fluoropolymer additive is made by combining a fluoropolymer, in the form of an aqueous dispersion of fluoropolymer particles, with a second polymer, precipitating the combined fluoropolymer particles and second polymer and then drying the precipitate to form the fluoropolymer additive. In a preferred embodiment, the fluoropolymer particles range in size from 50 to 500 nanometers ("nm"), as measured by electron microscopy.

In a preferred embodiment, the aqueous fluoropolymer dispersion comprises water and from 1 pbw to 80 pbw, based on 100 pbw of the dispersion, of fluoropolymer and from 0.1 pbw to 10 pbw, based on 100 pbw of the fluoropolymer, of a fatty acid salt according to the structural formula (1):

$$R^1COOH \qquad (1)$$

where $R^1$ is H, alkyl, cycloalkyl, aryl or HOOC—$(CH_X)_n$—; 

X=0, 1, 2; and n=0–70.

In a preferred embodiment, $R^1$ is $(C_1-C_{30})$alkyl or $(C_4-C_{12})$cycloalkyl. As used herein, the term "$(C_1-C_{30})$ alkyl" means a straight or branched alkyl substituent group having from 1 to 30 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl, dodecyl, stearyl, eicosyl, the term "$(C_4-C_{12})$ cycloalkyl" means a cyclic alkyl substituent group having from 4 to 12 carbon atoms per group, e.g., cyclohexyl, cylcooctyl and the term "aryl" means an organic radical derived from an aromatic hydrocarbon by removal of one hydrogen atom, which may optionally be substituted on the aromatic ring with one or more substituent groups, such as, e.g., phenyl, tolyl, naphthyl.

In a preferred embodiment, the fluoropolymer additive is made by emulsion polymerization of one or more monoethylenically unsaturated monomers in the presence of the aqueous fluoropolymer dispersion of the present invention to form a second polymer in the presence of the fluoropolymer. Suitable monoethylenically unsaturated monomers are disclosed above. The emulsion is then precipitated, e.g., by addition of sulfuric acid. The precipitate is dewatered, e.g., by centrifugation, and then dried to form a fluoropolymer additive that comprises fluoropolymer and an associated second polymer. The dry emulsion polymerized fluoropolymer additive is in the form of a free-flowing powder.

In a preferred embodiment, the monoethylenically unsaturated monomers that are emulsion polymerized to form the second polymer comprise one or more monomers selected from vinyl aromatic monomers, monoethylenically unsaturated nitrile monomer and $(C_1-C_{12})$alkyl (meth)acrylate monomers.

In a highly preferred embodiment, the second polymer comprises repeating units derived from styrene and acrylonitrile. More preferably, the second polymer comprises from 60 to 90 wt % repeating units derived from styrene and from 10 to 40 wt % repeating units derived from acrylonitrile.

The emulsion polymerization reaction mixture may optionally include emulsified or dispersed particles of a third polymer, such as, e.g., an emulsified butadiene rubber latex.

The emulsion polymerization reaction is initiated using a conventional free radical initiator such as, e.g., an organic peroxide compound, such as e.g., benzoyl peroxide, a persulfate compound, such as, e.g., potassium persulfate, an azonitrile compound such as e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate.

A chain transfer agent such as, e.g., a (C$_9$–C$_{13}$) alkyl mercaptan compound such as nonyl mercaptan, t-dodecyl mercaptan, may, optionally, be added to the reaction vessel during the polymerization reaction to reduce the molecular weight of the second polymer. In a preferred embodiment, no chain transfer agent is used.

In a preferred embodiment, the stabilized fluoropolymer dispersion is charged to a reaction vessel and heated with stirring. The initiator system and the one or more monoethylenically unsaturated monomers are then charged to the reaction vessel and heated to polymerize the monomers in the presence of the fluoropolymer particles of the dispersion to thereby form the second polymer.

Suitable fluoropolymer additives and emulsion polymerization methods are disclosed in EP 0 739 914 A1.

In a highly preferred embodiment, the composition of the present invention comprises a substantially homogeneous mixture of a rubber modified thermoplastic resin and a fluoropolymer additive comprising, based on 100 pbw of the additive, from 30 to 70 pbw, more preferably 40 to 60 pbw, of a fluoropolymer encapsulated in from 30 to 70 pbw, more preferably 40 to 60 pbw, of the second polymer, wherein the fluoropolymer additive is present in an amount effective to provide a thermoplastic resin molding composition comprising, based on 100 pbw of the molding composition, from 20 to 98 pbw, preferably 85 to 97 pbw, more preferably 88 to 96 pbw and still more preferably from 90 to 95 pbw of the combined rubber modified thermoplastic resin and second polymer and from 2 to 20, preferably from 3 to 15 pbw, more preferably from 4 to 12 pbw and still more preferably from 5 to 10 pbw of the fluropolymer.

Other Additives

The thermoplastic resin composition of the present invention may optionally also contain various conventional additives, such as:

(1) antioxidants, such as, e.g., organophosphites, e.g., tris(nonyl-phenyl)phosphite, (2,4,6-tri-tert-butylphenyl)(2-butyl-2-ethyl-1,3-propanediol) phosphite, bis(2,4-di-t-butylphenyl)pentaerythritol diphosphite or distearyl pentaerythritol diphosphite, as well as alkylated monophenols, polyphenols, alkylated reaction products of polyphenols with dienes, such as, e.g., butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphenyl) propionic acid with mono-or polyhydric alcohols, esters of thioalkyl or thioaryl compounds, such as, e.g., distearylthiopropionate, dilaurylthiopropionate, ditridecylthiodipropionate, amides of beta-(3,5-di-tert-butyl-4-hydroxyphenol)-propionic acid;

(2) UV absorbers and light stabilizers such as, e.g., (i) 2-(2'-hydroxyphenyl)-benzotriazoles, 2-Hydroxybenzophenones; (ii) esters of substituted and unsubstituted benzoic acids, (iii) acrylates, (iv) nickel compounds;

(3) metal deactivators, such as, e.g., N,N'-diphenyloxalic acid diamide, 3-salicyloylamino-1,2,4-triazole;

(4) peroxide scavengers, such as, e.g., (C$_{10}$–C$_{20}$)alkyl esters of β-thiodipropionic acid, mercapto benzimidazole;

(5) polyamide stabilizers;

(6) basic co-stabilizers, such as, e.g., melamine, polyvinylpyrrolidone, triallyl cyanurate; urea derivatives, hydrazine derivatives; amines, polyamides, polyurethanes;

(7) sterically hindered amines such as, e.g., triisopropanol amine or the reaction product of 2,4-dichloro-6-(4-morpholinyl)-1,3,5-triazine with a polymer of 1,6-diamine, N,N'-Bis(-2,2,4,6-tetramethyl-4-piperidenyl) hexane;

(8) neutralizers such as magnesium stearate, magnesium oxide, zinc oxide, zinc stearate, hydrotalcite;

(9) fillers and reinforcing agents, such as, e.g., silicates, TiO$_2$, glass fibers, carbon black, graphite, calcium carbonate, talc, mica;

(9) other additives such as, e.g., lubricants such as, e.g., pentaerythritol tetrastearate, EBS wax, silicone fluids, plasticizers, optical brighteners, pigments, dyes, colorants, flameproofing agents; anti-static agents; blowing agents;

(10) flame retardant additives such as, e.g., halogen-containing organic flame retardant compounds, organophosphate flame retardant compounds and borate flame retardant compounds.

The thermoplastic resin composition of the present invention is made, e.g., by melt mixing the components, e.g., in a two-roll mill, in a Banbury mixer or in a single screw or twin-screw extruder, mixing the components to produce a substantially homogeneous composition and optionally, reducing the composition so formed to particulate form, e.g., by pelletizing or grinding the composition.

The composition of the present invention can be molded into useful articles by a variety of means such as injection, extrusion, rotation, and blow molding and thermoforming to form articles such as, for example, automotive interior components, computer and business machine housings, electrical components, home appliances and media storage devices, such as, for example, audiovisual cassettes and disk drive components.

EXAMPLES

A fluoropolymer additive composition was made by aqueous emulsion polymerization.

An aqueous solution of a tallow fatty acid potassium salt ("K$^+$TFA") having a saponification number of 204 was prepared by combining demineralized water with a tallow fatty acid (T-11, Proctor & Gamble) and potassium hydroxide. The T-11 tallow fatty acid nominally comprises from 38–43 wt % oleic acid, from 24–32 wt % palmitic acid, from 20–25 wt % stearic acid, from 3–6 wt % myristic acid and from 2–3 wt % linoleic acid.

Water (160 pbw), was charged to a jacketed, temperature controlled, sealed reaction vessel that was equipped with an agitator. The water was then heated to 100° F. Potassium hydroxide (0.05 pbw) was added to the heated water and the contents of the vessel were then stirred for 5 minutes. The K$^+$TFA stabilizer (2 pbw) was charged to the reaction vessel and the contents of the vessel were then stirred for 5 minutes. Styrene monomer (10 pbw) was charged to the reaction vessel and the contents of the reaction vessel were then heated to 135° F. with continued stirring. A raw PTFE dispersion (125 pbw) containing 40 wt % PTFE and 60 wt % water was slowly charged to the reaction vessel with slow stirring. Separate streams of cumene hydroperoxide (0.375 pbw), styrene monomer (27.5 pbw) and acrylonitrile monomer (12.5 pbw) were then fed to the reactor at substantially uniform respective rates over the respective time periods set forth below in TABLE 1.

TABLE 1

| Feed Stream | $t_{start}$ (minutes) | $t_{end}$ (minutes) |
|---|---|---|
| cumene hydroperoxide | 0 | 70 |
| acrylonitrile | 5 | 70 |
| styrene | 10 | 70 |

The temperature was ramped up according to the following schedule: 135° F. from t=0 to t=30 minute, 139° F. from t=30 minutes to t=35 minutes, 142° F. from t=35 minutes to t=40 minutes, 145° F. from t=40 minutes to t=70 minutes and 160° F. from t=70 minutes to t=135 minutes.

The contents of the reaction vessel were allowed to cool to 70° F. and the reaction product was precipitated by transferred contents of the reaction vessel to a second reaction vessel that contained a solution of $H_2SO_4$ (4 pbw) in water (96 pbw) at a temperature of about 205° F. After the transfer was completed, sufficient water was added to the second reaction vessel to drop the temperature of contents of the reaction vessel to 60° F. The contents of the second reaction vessel were then centrifuged and dried to produce a solid PTFE additive. The product was obtained in the form of a free-flowing powder and had a styrene content of 36.5 wt %, an acrylonitrile content of 10.7 wt % and a PTFE content of 52.9 wt %, as measured by Fournier Transfer Infrared Spectroscopy.

The thermoplastic resin compositions of Comparative Example C1 and Examples 1 and 2 were made by combining the components described below in the relative amounts (each expressed in percent by weight, based on the total weight of the respective thermoplastic resin composition) set forth in TABLE I. The components used in the thermoplastic resin compositions were as follows:

ABS 1: An acrylonitrile-butadiene-styrene resin composition comprising 20 wt % butadiene rubber particles having an average particle size of about 300 nm and 80 wt % of a styrene-acrylonitrile copolymer comprising 75 wt % styrene and 25 wt % acrylonitrile.

ABS 2: An acrylonitrile-butadiene-styrene resin composition comprising 16 wt % butadiene rubber particles having an average particle size of about 300 nm and 84 wt % of a styrene-acrylonitrile copolymer comprising 75 wt % styrene and 25 wt % acrylonitrile.

PTFE/SAN: A fluoropolymer additive composition made according to the process disclosed above, having a PTFE content of about 55 wt %, a styrene content of about 34.8 wt % and an acrylonitrile content of about 10.2 wt %.

Melt viscosity of the compositions of comparative examples C1, C2 and examples 1 and 2 were measured at 500° F. and a shear rate of $1000s^{-1}$ using a capillary rheometer.

Test specimens of the compositions of Comparative Examples C1, C2 and Examples 1 and 2 were molded. Notched impact Izod performance was measured according to ASTM D256 at 73° F. Tensile strength was measured according to ASTM D 638 using a 0.2 inch per minute crosshead speed and flexural strength and flexural modulus were measured according to ASTM D790. The coefficient of friction for specimens molded from the compositions of comparative example C1 and examples 1 and 2 was calculated as the ratio of tangential force to normal force for two specimens of each of the respective compositions sliding in contact with each other. Tangential force was measured using a load cell and recording the force continuously as sliding between the samples commenced at a rate of 1.0 inch per minute and a normal loading of 1.0 kilograms. The tangential force at the commencement of sliding motion was used to calculate static coefficient of friction and average force value during sliding was used to calculate the dynamic coefficient of friction.

Results of the testing are set forth in TABLE I for each of the compositions of Comparative Examples C1 and C2 and Examples 1 and 2 as Melt Viscosity in Poise ("P"), Notched Izod impact strength in foot-pounds per inch ("ft-lb/in"), Tensile Strength in kilopounds per square inch ("kpsi"), Tensile Elongation as % of initial length ("%"), Flexural Strength and Flexural Modulus, each expressed in kpsi, and PTFE content, expressed as a weight percent (%) Coefficient of Friction: Dynamic and Coefficient of Friction: Static.

TABLE I

| Example # | C1 | C2 | 1 | 2 |
|---|---|---|---|---|
| ABS 1 (pbw) | 100 | — | 90 | 85 |
| ABS 2 (pbw) | — | 100 | — | — |
| PTFE/SAN (pbw) | 0 | 0 | 10 | 15 |
| Rubber content (wt %) | 20 | 16 | 18 | 17 |
| PTFE Content (wt %) | 0 | 0 | 4.8 | 7.9 |
| Properties | | | | |
| Melt Viscosity (Poise) | 1347 | 1172 | 2247 | 1992 |
| Tensile Strength (kpsi) | 5.590 | 6.39 | 5.800 | 6.175 |
| Tensile Modulus (kpsi) | 299.6 | 316.9 | 374.5 | 406.1 |
| Elongation (%) | 37 | 19 | 44 | 37 |
| Flexural Strength (kpsi) | 9.435 | 10.68 | 9.640 | 10.205 |
| Flexural Modulus (kpsi) | 319.8 | 340.5 | 355.9 | 375.4 |
| Notched Izod (ft-lb/in) | 6.5 | 4.6 | 2.7 | 3.3 |
| Coefficient of Friction: | | | | |
| Static | 0.587 | — | 0.239 | 0.277 |
| Dynamic | 0.414 | — | 0.258 | 0.256 |

The compositions of Examples 1 and 2 exhibit improved tensile modulus and ductility compared to Comparative Examples C1 and C2 and reduced coefficients of static and dynamic friction compared to Comparative Example C1.

We claim:

1. A thermoplastic resin molding composition that comprises a substantially homogeneous mixture of:
   (a) a rubber modified thermoplastic resin, comprising a discontinuous elastomeric phase dispersed in a rigid thermoplastic phase, wherein at least a portion of the rigid thermoplastic phase is chemically grafted to the elastomeric phase; and
   (b) from 2 parts by weight to 20 parts by weight of fluoropolymer encapsulated in a second polymer, based on 100 parts by weight of the resin composition.

2. The composition of claim 1, wherein the composition comprises from 3 to 15 parts by weight of the fluoropolymer.

3. The composition of claim 1, wherein the fluoropolymer comprises polytetrafluroethylene.

4. The composition of claim 3, wherein the fluoropolymer encapsulated in a second polymer comprises, based on 100 pbw of the fluoropolymer encapsulated in a second polymer, from 30 to 70 pbw of the fluoropolymer and from 30 to 70 pbw of the second polymer.

5. The composition of claim 4, wherein the second polymer comprises a copolymer having repeating units derived from one or more monomers selected from vinyl aromatic monomers, monoethylenically unsaturated nitrile monomer and (C$_1$–C$_{12}$)alkyl (meth)acrylate monomers.

6. The composition of claims 4, wherein the composition comprises from 20 to 98 parts by weight of the combined rubber modified thermoplastic resin and second polymer and from 2 to 20 parts by weight of the fluropolymer.

7. The composition of claim 1, wherein elastomeric phase of the rubber modified thermoplastic resin comprises a polymer having repeating units derived from one or more conjugated diene monomers and the rigid thermoplastic phase of the rubber modified thermoplastic resin comprises a polymer having repeating units derived from one or more monomers selected from vinyl aromatic monomers and monoethylenically unsaturated nitrile monomers.

8. An article made by molding the composition of claim 1.

* * * * *